United States Patent
Na et al.

(10) Patent No.: US 9,793,557 B2
(45) Date of Patent: Oct. 17, 2017

(54) THERMAL MANAGEMENT SYSTEM AND METHOD FOR FUEL CELL VEHICLE

(71) Applicants: Hyundai Motor Company, Seoul (KR); Kia Motors Corporation, Seoul (KR)

(72) Inventors: Sung Wook Na, Gyeonggi-Do (KR); Hun Woo Park, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 170 days.

(21) Appl. No.: 14/550,929

(22) Filed: Nov. 22, 2014

(65) Prior Publication Data

US 2015/0188156 A1 Jul. 2, 2015

(30) Foreign Application Priority Data

Dec. 30, 2013 (KR) .................. 10-2013-0166446

(51) Int. Cl.
| | |
|---|---|
| *H01M 8/04* | (2016.01) |
| *F28D 1/00* | (2006.01) |
| *F28F 19/01* | (2006.01) |
| *H01M 8/04029* | (2016.01) |
| *H01M 8/0432* | (2016.01) |
| *H01M 8/04746* | (2016.01) |
| *H01M 8/04044* | (2016.01) |
| *H01M 8/04007* | (2016.01) |

(52) U.S. Cl.
CPC .......... *H01M 8/04029* (2013.01); *F28D 1/00* (2013.01); *F28F 19/01* (2013.01); *H01M 8/04044* (2013.01); *H01M 8/04358* (2013.01); *H01M 8/04768* (2013.01); *H01M 8/04067* (2013.01); *H01M 2250/20* (2013.01); *Y02E 60/50* (2013.01); *Y02T 90/32* (2013.01)

(58) Field of Classification Search
CPC ....... F28D 1/00; F28F 19/01; H01M 2250/20; H01M 8/04029; H01M 8/04044; H01M 8/04067; H01M 8/04358; H01M 8/04768; Y02E 60/50; Y02T 90/32
See application file for complete search history.

(56) References Cited

U.S. PATENT DOCUMENTS

| | | | | |
|---|---|---|---|---|
| 2002/0164511 A1* | 11/2002 | Uozumi | ............ | H01M 8/04029 429/429 |
| 2003/0031905 A1* | 2/2003 | Saito | ................. | H01M 8/04007 429/429 |
| 2007/0137674 A1 | 6/2007 | Shih et al. | | |

(Continued)

FOREIGN PATENT DOCUMENTS

| | | |
|---|---|---|
| JP | 2004-071331 A | 3/2004 |
| JP | 2004-311347 A | 11/2004 |
| KR | 10-2010-0074964 | 7/2010 |

(Continued)

*Primary Examiner* — Carlos Barcena
(74) *Attorney, Agent, or Firm* — Mintz Levin Cohn Ferris Glovsky and Popeo, P.C.; Peter F. Corless

(57) ABSTRACT

A thermal management system and method for a fuel cell vehicle is provided. In particular, a radiator, a 3-way valve, a pump, a heater, and a stack are all connected in that order. The system is capable of selectively de-mineralizing and providing an increase in flow rate by connecting a de-mineralizer line to a port at a bypass line side of a 3-way valve.

12 Claims, 6 Drawing Sheets

(56) References Cited

U.S. PATENT DOCUMENTS

2015/0072259 A1* 3/2015 Furukoshi ......... H01M 8/04029
429/436

FOREIGN PATENT DOCUMENTS

| KR | 10-2012-0032345 A | 4/2012 | | |
|---|---|---|---|---|
| KR | 10-2012-0032360 A | 4/2012 | | |
| KR | 10-2012-0032282 | 5/2012 | | |
| WO | WO 2013153782 A1 * | 10/2013 | ........ | H01M 8/04029 |

* cited by examiner

THERMAL MANAGEMENT SYSTEM AND METHOD FOR FUEL CELL VEHICLE

CROSS-REFERENCE TO RELATED APPLICATION

This application claims under 35 U.S.C. §119(a) the benefit of Korean Patent Application No. 10-2013-0166446 filed on Dec. 30, 2013, the entire contents of which are incorporated herein by reference.

BACKGROUND (a) Technical Field

The present invention relates to a thermal management system and method for a fuel cell vehicle. More particularly, the present invention relates to a thermal management system and method capable of performing selective de-mineralizing so as to improve a heat radiating performance in the thermal management system adopted in a fuel cell system.

(b) Background Art

A fuel cell system assembled in a fuel cell vehicle typically includes a fuel cell stack which generates electrical energy from an electrochemical reaction of reaction gas, a hydrogen supply apparatus which supplies hydrogen as a fuel to the fuel cell stack, an air supply apparatus which supplies air including oxygen to the fuel cell stack, and a thermal and water management system which dissipates the heat of the fuel cell stack to an environment outside of the fuel cell stack to optimally control an operating temperature and perform a water management function.

The fuel cell stack produces heat and water as reaction byproducts during an electrochemical reaction process of hydrogen and oxygen which are reaction gases and in order for the fuel cell stack to exhibit an optimal output performance, a temperature of the fuel cell stack needs to be managed at an optimum temperature at the time of starting or during operation. In particular, it is essential to use a thermal management system which rapidly increases the temperature of the fuel cell stack at the time of starting and maintains the temperature of the fuel cell stack at an optimum temperature during operation.

For example, a conventional thermal management system of the fuel cell vehicle is illustrated in FIG. 1. FIG. 1 is a schematic diagram illustrating a cooling water loop in a thermal management system of a fuel cell vehicle, in which the thermal management system of the fuel cell vehicle includes a radiator 2 which dissipates heat generated when the fuel cell stack 1 generates power, a cooling water circulating line 3 which is connected between the fuel cell stack 1 and the radiator 2 to be able to circulate cooling water therebetween, a bypass line 4 and a 3-way valve 5 which selectively bypass the cooling water to prevent the cooling water from passing through the radiator 2, a water pump 6 which pumps and circulates the cooling water, and a heater 7 which increases the temperature of the cooling water to warm the fuel cell stack.

In order to maintain electric conductivity of the cooling water at a predetermined level or less, a de-mineralizer (DMN) 9 which filters ions present in the cooling water may be disposed in a branch line 8 of the cooling water loop. The thermal management system dissipates the heat generated when the fuel cell stack generates power to the outside while circulating the cooling water along a path of radiator 2, to a 3-way valve 5, next to a water pump 6, then to a heater 7 and finally to a fuel cell stack 1.

In particular, the cooling water passing through the de-mineralizer 9 which is equipped in the branch line 8 of the cooling water loop again returns to the cooling water loop through a rear stage of the 3-way valve side as illustrated in FIG. 1. A connection structure between the 3-way valve and the branch line of the de-mineralizer is illustrated in more detail in FIG. 2.

As illustrated in FIG. 2, the 3-way valve 5 includes a first port 5a which is connected to a radiator side, a second port 5b which is connected to a bypass line, and a third port 5c which moves the cooling water passing through the two lines to the pump side.

Further, the branch line 8 of the de-mineralizer is connected to the third port side and due to a position of the branch line 8 which is disposed at an outlet of the third port, the flow rate of the de-mineralizer is always generated regardless of whether the 3-way valve is open or not.

Therefore, since the de-mineralizer loop is always opened, the high temperature cooling water always passes through the de-mineralizer loop and is unnecessarily subjected to de-mineralizing. As such, a service life of the de-mineralizer may be shortened.

Further, since the cooling water of about 10% of the entire cooling flow rate continuously flows through the de-mineralizer loop, the cooling flow rate is lost and the heat radiating performance is reduced.

Meanwhile, since a polymer electrolyte fuel cell (PE-FMC) equipped in the vehicle is often operated at low temperatures, a radiator having a significant heat radiating area is required, but in a hot season, a heat radiating amount from the radiator may be less than a heating value of the fuel cell stack. Therefore, as illustrated in FIG. 3, when the temperature of cooling water at an outlet of the fuel cell stack is increased and thus reaches a set temperature, a fuel cell control unit (FCU) limits a current output of the fuel cell stack to protect the fuel cell stack to prevent the temperature of the cooling water from increasing beyond than the set temperature. This is referred to as a high temperature current limitation.

When the rapid acceleration and high output operation of the vehicle is extended over a pro-longed period of time (for example, driving on a highway or driving on an uphill road) or the flow rate of the cooling water is insufficient during a summer season, the cooling water reaches a higher temperature and thus a high temperature current limitation frequently occurs. As such, the output from the fuel cell stack is insufficient even though a driver presses an accelerator pedal during this limited current period.

Since there is a need to increase the insufficient heat radiating amount so as to prevent the high temperature current limitation from frequently occurring, a method for additionally increasing heat radiating areas of a radiator may be considered as an optional solution to this problem. However, the size of the radiator is limited by the vehicle layout configuration and thus a larger radiator is not desirable.

Further, heat radiating performance may be maximized by using the high performance/high flow rate pump. However, again there is a drawback to this. In particular, the high pressure of the cooling water generated at the time of the high flow rate operation of the pump may exceed an internal pressure level of the fuel cell stack. When this occurs, water leakage due to failure of the structure of the fuel cell stack may occur, and therefore this solution has its limitations as well.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art, and provides a thermal management system and method for a fuel cell vehicle capable of improving a heat radiating performance of a thermal management system to increase a current limiting time of arrival of a vehicle even though a temperature of a fuel cell stack is largely increased due to a high output operation during a summer season, thereby improving output stability of the fuel cell stack and improving durability of a de-mineralizer into which high temperature cooling water is introduced.

In one aspect, the present invention provides a thermal management system for a fuel cell vehicle, including: a radiator configured to dissipate heat generated from a fuel cell stack through cooling water provided therein; a de-mineralizer disposed in a branch line branched from a cooling water circulating line connecting between the fuel cell stack and the radiator to allow cooling water to pass therethrough; and a 3-way valve configured to include a first port, a second port, and a third port. The first port is configured to be connected to a radiator line along which the cooling water passing through the radiator flows, the second port is configured to be connected to a bypass line formed prior to the radiator within the cooling water circulating line, and the third port is configured to be connected to the fuel cell stack side, and the de-mineralizer line along which the cooling water passing through the de-mineralizer flows is configured to be connected to the second port side.

In an exemplary embodiment, the 3-way valve may be configured to open both of the first port and the second port or selectively open only one of the first port and the second port.

In some exemplary embodiments, the thermal management system for a fuel cell vehicle may further include: a controller configured to control an open value of the 3-way valve.

In still another exemplary embodiment, the controller may divide a section into a low output section, a normal output section, and a high output section depending on an output state of the vehicle and variably control the open value of the 3-way valve in each section.

In yet another exemplary embodiment, the controller may close the first port connected to a radiator line side and completely open the second port connected to the bypass line when operating in the low output section, completely open the first port and close the second port when operating in the high output section, and partially open both of the first port and the second port when operating in the normal output section.

In still yet another exemplary embodiment, the controller may be configured to increase and reduce the flow rate passing through the de-mineralizer line depending on the open value of the second port in proportion to the bypass flow rate passing through the second port in the normal output section and prevent generation of the flow rate passing through the de-mineralizer line due to the closing of the second port in the high output section.

In a further exemplary embodiment, the controller may divide a section into a low temperature section, a reference temperature section, and a high temperature section depending on the temperature of cooling water of the vehicle and variably control the open value of the 3-way valve in each section.

In another further exemplary embodiment, the controller may be configured to close the first port connected to the radiator line side and completely open the second port connected to the bypass line in the low temperature section, completely open the first port and close the second port in the high temperature section, and partially open both of the first port and the second port in the reference temperature section.

In still another further exemplary embodiment, the controller may be configured to increase and reduce the flow rate passing through the de-mineralizer line depending on the open value of the second port in proportion to the bypass flow rate passing through the second port in the reference temperature section. As such in this state, the flow rate passing through the de-mineralizer line is not generated due to the closing of the second port in the high temperature section.

In yet another further exemplary embodiment, the low temperature section may be a case in which the temperature of cooling water of the vehicle is less than a preset reference temperature X, the high temperature section may be a case in which the temperature of cooling water of the vehicle exceeds the reference temperature X, and the reference temperature section may be set to be a section in which the temperature of cooling water is the reference temperature X.

In still yet another further exemplary embodiment, the thermal management system for a fuel cell vehicle may further include: a water pump that is configured to circulate cooling water which is equipped between the 3-way valve and the fuel cell stack.

In a still further exemplary embodiment, the thermal management system for a fuel cell vehicle may further include: a heater that is configured and disposed to increase the temperature of cooling water which is equipped between the water pump and the fuel cell stack.

In another aspect, the present invention provides a thermal management method for a fuel cell vehicle, including: detecting an output state of the vehicle; determining to which of a preset low output section, normal output section, and high output section the detected output state belongs; and determining an open value of a 3-way valve by a controller depending on the determined section. The controller, in particular, may be configured to close the first port connected to the radiator line side and completely open the second port connected to the bypass line in the low output section, completely open the first port and close the second port in the high output section, and partially open both of the first port and the second port in the normal output section.

In an exemplary embodiment, in the determining of the open value of the 3-way valve, the controller may be configured to increase and reduce the flow rate passing through the de-mineralizer line depending on the open value of the second port in proportion to the bypass flow rate passing through the second port in the normal output section and so as not to generate the flow rate passing through the de-mineralizer line according to the closing of the second port in the high output section, depending on the open value of the 3-way valve.

In still another aspect, the present invention provides a thermal management method for a fuel cell vehicle, including: detecting a temperature of cooling water of a vehicle; determining to which of a preset low temperature section, reference temperature section, and high temperature section the detected temperature belongs; and determining an open value of a 3-way valve by a controller depending on the determined section, wherein the controller is configured to close the first port connected to the radiator line side and completely open the second port connected to the bypass line in the low temperature section, completely open the first port and close the second port in the high temperature section, and partially open both of the first port and the second port in the reference temperature section.

In an exemplary embodiment, in the determining of the open value of the 3-way valve, the controller may be configured to increase and reduce the flow rate passing through the de-mineralizer line depending on the open value of the second port in proportion to the bypass flow rate passing through the second port in the reference temperature section and so as not to generate the flow rate passing through the de-mineralizer line according to the closing of the second port in the high temperature section, depending on the open value of the 3-way valve.

In another exemplary embodiment, the low temperature section may be a case in which the temperature of cooling water of the vehicle is less than a preset reference temperature X, the high temperature section may be a case in which the temperature of cooling water of the vehicle exceeds the reference temperature X, and the reference temperature section may be set to be a section in which the temperature of cooling water is the reference temperature X.

The thermal management system and method for a fuel cell vehicle according to the exemplary embodiments of the present invention have the following effects.

First, it is possible to improve the output stability of the fuel cell stack and improve the durability of the fuel cell stack by increasing the vehicle current limiting time of arrival due to the high temperature cooling water at the time of the high output operation during a summer season, that is, when outside temperature is high.

Second, it is possible to improve the durability of the de-mineralizer by shortening the contact time of the ion resin with the high temperature cooling water by closing off the de-mineralizer loop during high output of the high temperature cooling water.

Third, it is possible to improve the heat radiating performance in the high output state by selectively reducing the flow rate which is bypassed to the de-mineralizer side in order to reduce the pump operation rate, thereby improving fuel efficiency of the vehicle.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
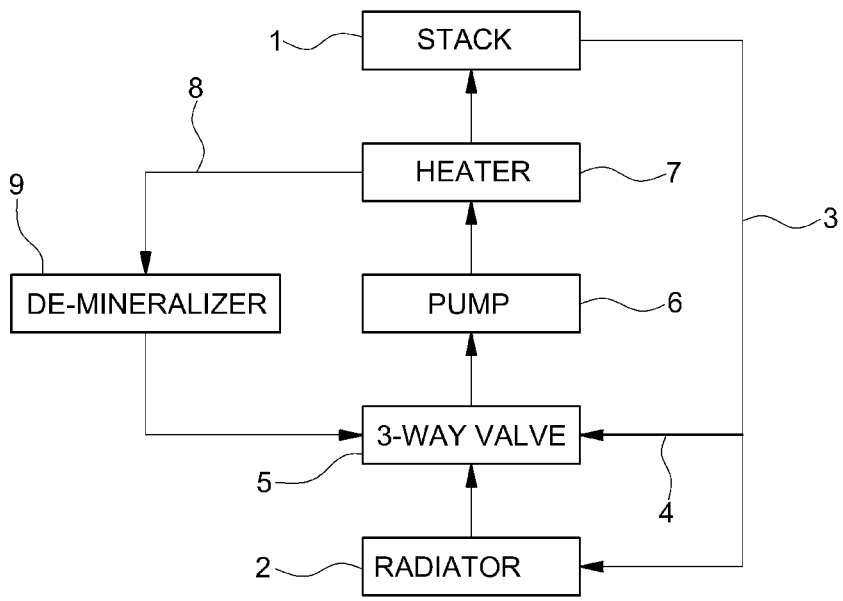
FIG. 1 is a schematic diagram illustrating a cooling water loop in a thermal management system for a fuel cell vehicle according to the related art.
Figure 2:
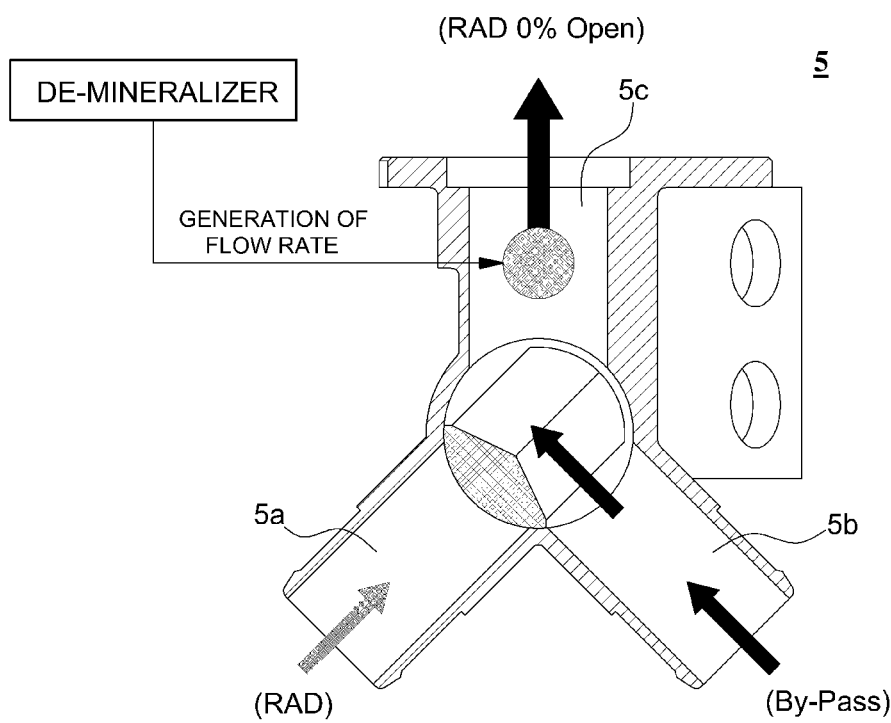
FIG. 2 is a diagram schematically illustrating a 3-way valve and a de-mineralizer line connected to the 3-way valve in the thermal management system of FIG. 1.

Reference numerals set forth in the Drawings includes reference to the following elements as further discussed below:

| 11: fuel cell stack | 12: radiator |
|---|---|
| 13: cooling water circulating line | 14: bypass line |
| 15: 3-way valve | 15a: first port |
| 15b: second port | 15c: third port |
| 16: water pump | 17: heater |
| 18: branch line | 19: de-mineralizer |
| 20: radiator line | 21: controller |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings so as to be easily practiced by a person skilled in the art to which the present invention pertains.

The present invention relates to a selective de-mineralizing apparatus of a fuel cell system and method for a vehicle, and implements a thermal management system in which a radiator, a 3-way valve, a pump, a heater and a stack are connected in that order and provide a selective de-mineralizing apparatus and method for a fuel cell system for a vehicle capable of implementing selective de-mineralization and an increase in flow rate by connecting a de-mineralizer line to a port at a bypass line side of a 3-way valve.

Hereinafter, a selective de-mineralizing apparatus and method for a fuel cell system for a vehicle according to an exemplary embodiment of the present invention will be described in detail with reference to the accompanying drawings.

Figure 4:
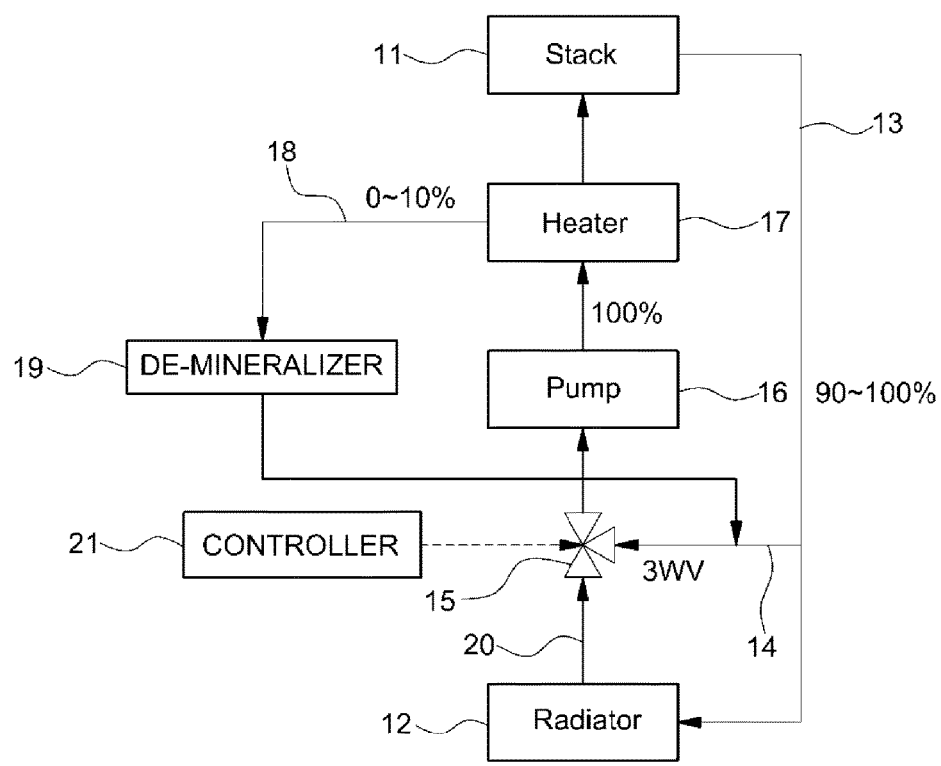
FIG. 4 is a schematic diagram illustrating a thermal management system according to an exemplary embodiment of the present invention.
Figure 5:
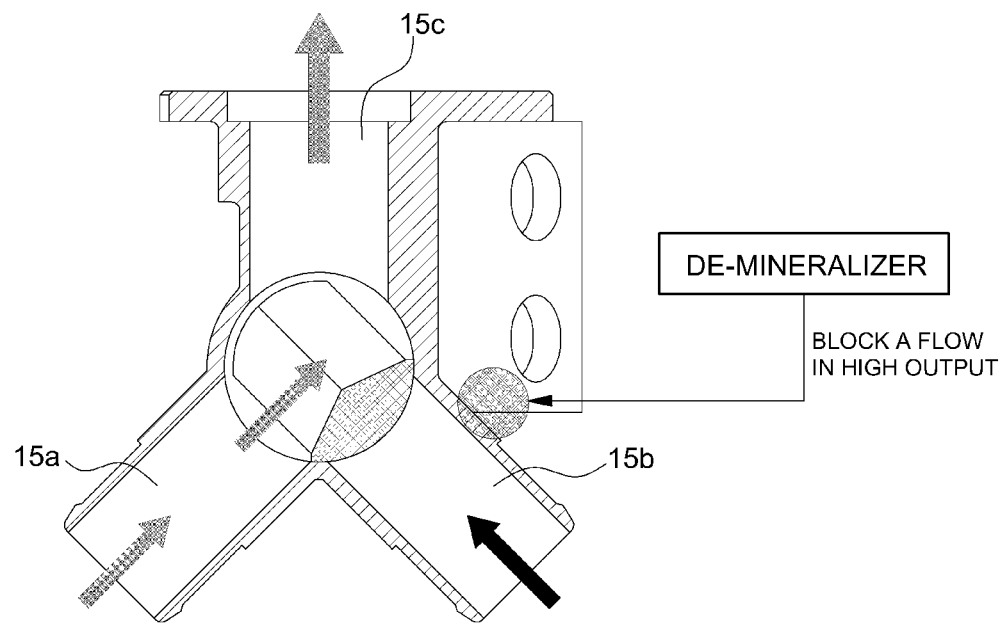
FIG. 5 is a diagram schematically illustrating a 3-way valve and a de-mineralizer line connected to the 3-way valve in the thermal management system of FIG. 4.

FIG. 4 schematically illustrates a thermal management system according to an exemplary embodiment of the present invention. As illustrated in FIG. 4, the thermal management system according to the exemplary embodiment of the present invention is configured to include a radiator 12 which dissipates heat generated by power generation of a fuel cell stack 11, a cooling water circulating line 13 connected between the fuel cell stack 11 and the radiator 12 to circulate cooling water therebetween, a bypass line 14 selectively bypassing the cooling water to prevent the cooling water from passing through the radiator 12, a 3-way valve 15 which connects the radiator line and the bypass line 14 to the fuel cell stack side, and a controller 21 which controls an open value of the 3-way valve.

Further, as illustrated in FIG. 4, the thermal management system may include a water pump 16 which circulates cooling water and a heater 17 which increases a temperature of cooling water. In this configuration, a de-mineralizer 19 is equipped in a branch line 18 which is branched from the cooling water circulating line 13.

Figure 3:
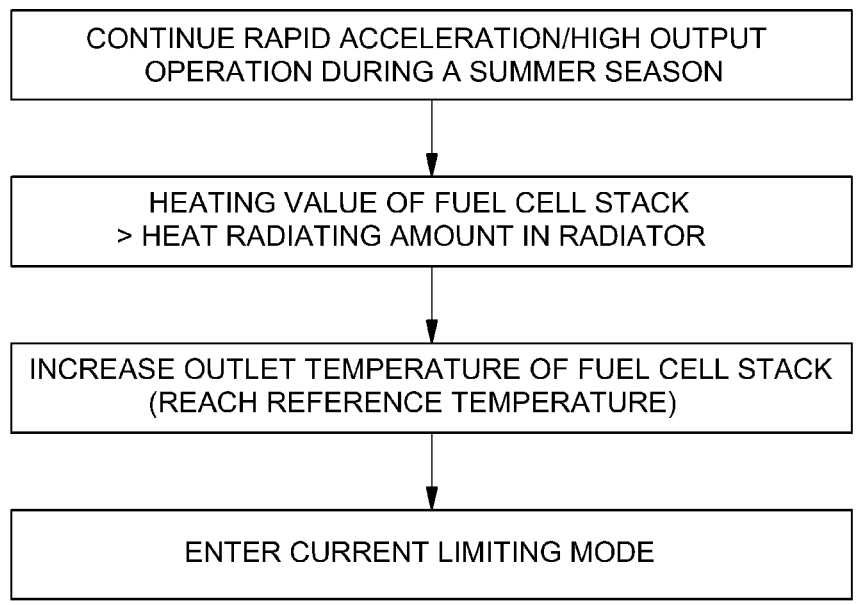
FIG. 3 is a diagram illustrating a current limiting process of the fuel cell system.

The thermal management system according to the exemplary embodiment of the present invention is configured to introduce the cooling water passing through the de-mineralizer 19 connected to the branch line 18 into the bypass line 14 of a front stage of the 3-way valve 15. According to the exemplary embodiment of the present invention, the 3-way valve 15 includes a first port 15a, a second port 15b, and a third port 15c, in which each port is connected as illustrated in FIGS. 3 and 4.

In detail, referring to FIG. 4 which illustrates a detailed connection structure of the 3-way valve 15, the first port 15a is connected to a radiator line 20 along which the cooling water passing through the radiator 12 flows, the second port 15b is connected to the bypass line 14 which is formed on an inlet side the radiator 12 of the cooling circulating line, and the third port 15c is connected on the to the fuel cell stack 11 side of the cooling circulating line.

Here, the de-mineralizer line 18 along which the cooling water passing through the de-mineralizer 19 flows is connected to the second port 15b side of the 3-way valve 15 and is joined with the cooling water passing through the bypass line 14 and thus the cooling water is introduced into the second port 15b.

Further, the controller controls an open value of the 3-way valve 15 and is configured to selectively open the first port 15a connected to the radiator line 20 and the second port 15b connected to the bypass line 14 or partially open both of the first port 15a and the second port 15b at a predetermined ratio. Therefore, in the case of the de-mineralizer line 18 being connected to the front part of the second port 15b, when the second port 15b is opened and thus the cooling water is introduced into the full cell stack 11 side through the bypass line 14, a flow rate is formed but when the second port 15b is closed, a flow rate is prevented.

Therefore, since a flow rate of cooling water flowing along the de-mineralizer line 18 may be selectively formed, the selective de-mineralizing may be performed depending on the control of the 3-way valve 15.

The control of the flow rate of cooling water will be described in more detail below.

In the thermal management system of a fuel cell vehicle according to the exemplary embodiment of the present invention, a plurality of predetermined sections are set depending on an output state of the vehicle or the temperature of cooling water and the open value of the 3-way valve 15 is controlled for each of the plurality of set sections to control the selective de-mineralization and the flow rate of cooling water.

In the case of the exemplary embodiment in which the section is set based on the output state of the vehicle, the sections are divided into a low output section, a normal output section, and a high output section depending on a preset reference output value depending on the output state of the vehicle. Additionally, the open value of the 3-way valve 15 is variably controlled in each section.

Figure 6A:
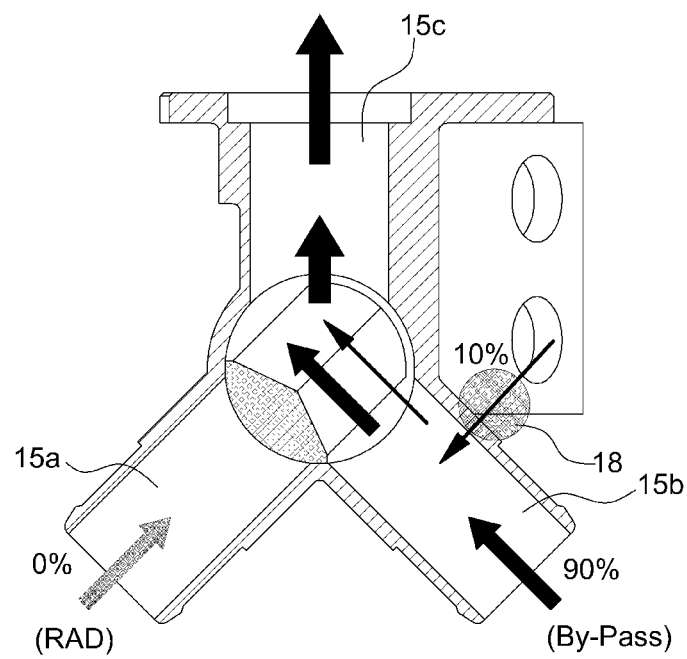
FIGS. 6A to 6C are diagrams illustrating an opening state of the 3-way valve and a change in a flow rate of cooling water depending on an output state (or temperature of cooling water) of a vehicle in the thermal management system according to the exemplary embodiment of the present invention.
Figure 6B:
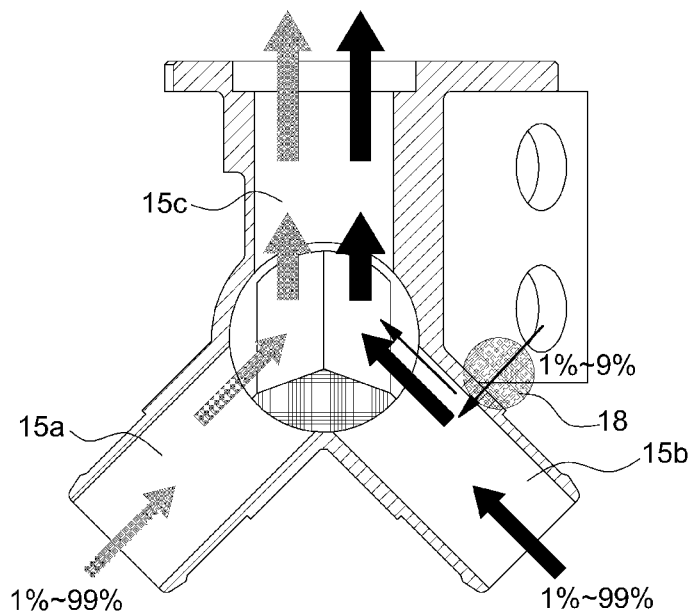
Figure 6C:
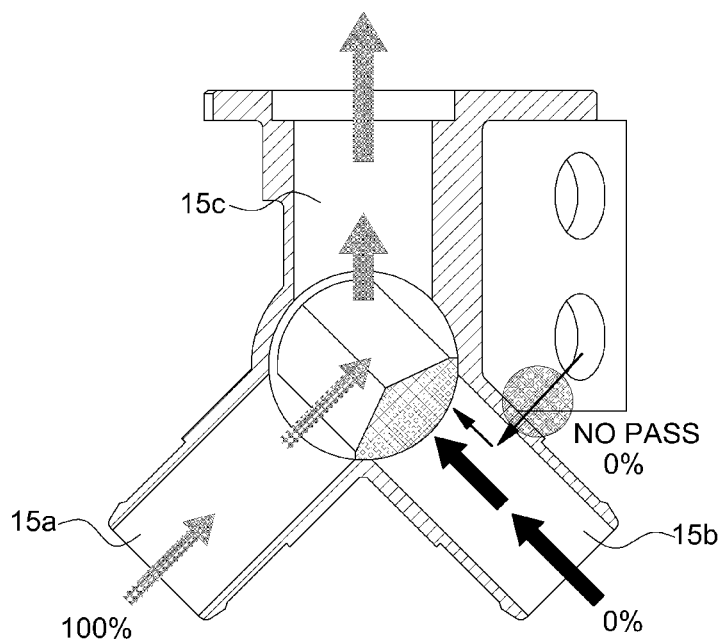

FIGS. 6A to 6C illustrate a valve opening state and a change in the flow rate of cooling water depending on a preset vehicle output state (or temperature of cooling water). First, FIG. 6A illustrates the state of the 3-way valve 15 in the low output section. As illustrated in FIG. 6A, when the 3-way valve 15 is in the low output section, the controller controls an open value to close the first port 15a of the 3-way valve 15 and open the second port 15b.

That is, the first port 15a connected to the radiator line 20 side is closed in the low output section but the second port 15b connected to the bypass line 14 is completely opened, such that only the flow rate of cooling water through the bypass line 14 is formed.

In this case, the de-mineralizer line 18 connected to the bypass line 14 before the cooling water enters the second port 15b also forms a maximum flow rate of 10% by opening the second port 15b.

Meanwhile, when the fuel cell stack 11 is stably driven in the normal output section, the open value of the valve is appropriately selected in the state in which a part of the first port 15a of the radiator line 20 side and a part of the second port 15b of the bypass line 14 side are completely opened.

That is, in the state in which both of the first port 15a and the second port 15b are opened in the normal output section, the flow rate of cooling water passing through the radiator line 20 and the flow rate of cooling water passing through the bypass line 14 are each variably formed.

Further, the flow rate of cooling water passing through the de-mineralizer line 18 is also formed in proportion to the flow rate of cooling water passing through the bypass line 14 in the normal output section.

Meanwhile, in the thermal management system for the fuel cell vehicle according to one implementation example (exemplary embodiment?) of the present invention, the controller controls the 3-way valve 15 to completely open the first port 15a and completely close the second port 15b in the high output section.

Therefore, unlike the normal output section in which the flow rate passing through the de-mineralizer line 18 is increased and reduced depending on the open value of the second port 15b in proportion to the bypass flow rate passing through the second port 15b, the second port 15b is closed in the high output section and thus the flow rate passing through the de-mineralizer line 18 is not generated.

Consequently, according to the exemplary embodiment of the present invention, since the flow rate passing through the de-mineralizer line 18 may not be formed in the high output section, the entire cooling water within the thermal management system passes through the radiator line 20 and then enters the fuel cell stack 11 side, thereby maximizing heat radiation performance.

Figure 7:
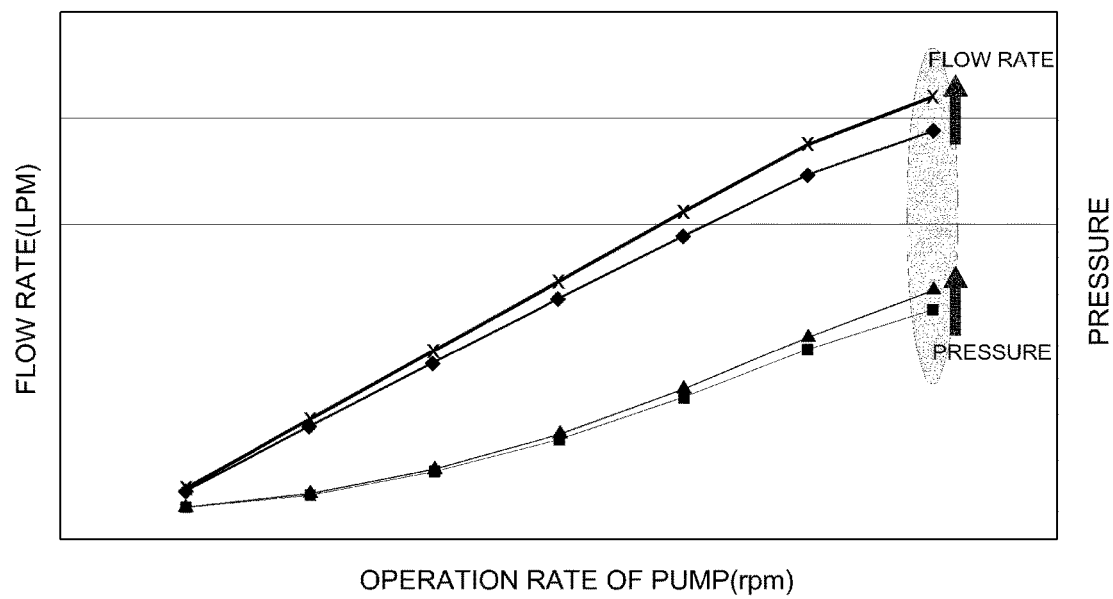
FIG. 7 is a graph illustrating a test result when the de-mineralizer loop in the thermal management system according to the exemplary embodiment of the present invention is cut off.

FIG. 7 illustrates an experimental graph which may indirectly confirm the effect and illustrates a test result when the de-mineralizer line 18 is cut off in the high output section.

In detail, in the test of FIG. 7, an experiment is made at a pump operation rate of 3500 rpm in the state in which the 3-way valve 15 is completely opened with the temperature of cooling water at 85° C. and FIG. 7 illustrates a result obtained by comparing and measuring the flow rate and pressure of cooling water of the radiator line 20 before and after the de-mineralizer line 18 is cut off.

As the comparison result, it may be confirmed that the flow rate of the radiator line 20 is increased by about 8.11% from 194 LPM to 210 LPM and it may be confirmed that the pressure of the radiator line 20 is also increased by about 7.99%.

Therefore, as the cut off result of the de-mineralizer line 18, it may be confirmed that as illustrated in FIG. 7, both of the flow rate and pressure of cooling water are increased. Consequently, according to exemplary embodiment of the present invention, it may be indirectly confirmed that the heat radiating performance is improved due to the cut off of the de-mineralizer line 18.

Meanwhile, according to another exemplary embodiment of the present invention, a section is set based on the temperature of cooling water of the vehicle and the open value of the 3-way valve 15 is variably controlled in each of the set sections.

That is, according to the exemplary embodiment of the present invention, the section is divided into a low temperature section, a reference temperature section, and a high temperature section depending on the preset reference temperature of cooling water of the vehicle and the open value of the 3-way valve 15 is variably controlled in each section.

The low temperature section, the reference temperature section, and the high temperature section each correspond to the low output section, the normal output section, and the high output section in the above-mentioned exemplary embodiment and the open value of the 3-way valve 15 is controlled by the controller using the same scheme as the previously exemplary embodiment.

Therefore, the controller closes the first port 15*a* which is connected to the radiator line 20 side and completely opens the second port 15*b* which is connected to the bypass line 14 in the low temperature section.

Further, the controller is configured to control the second port 15*b* instead of completely opening the first port 15*a* in the high temperature section and partially open both of the first port 15*a* and the second port 15*b* in the reference temperature section.

In this case, the flow rate passing through the de-mineralizer line 18 in the high temperature section is not formed due to the closing of the second port 15*b*. On the other hand, the flow rate passing through the de-mineralizer line 18 in the reference temperature section is increased and reduced depending on the open value of the second port 15*b* in proportion to the bypass flow rate passing through the second port 15*b* and the maximum flow rate is formed by completely opening the second port 15*b* in the low temperature section.

Meanwhile, the reference temperature setting each section may be determined depending on the operation temperature of the fuel cell stack 11 and preferably, the preset operation temperature of cooling water is set to be a reference temperature X in consideration of the optimum state of the fuel cell stack.

Therefore, the section corresponding to the reference temperature X or a predetermined temperature range including the reference temperature may be set to be a reference temperature section, the section which is less than the reference temperature or less than a lower range of the reference temperature range may be set to be a low temperature section, and the section which exceeds the reference temperature or an upper range of the reference temperature range may be set to be a high temperature section.

The following Tables 1 and 2 show a comparison result of the current limiting time of arrival in the cooling water loop according to the related art with the high temperature current limiting time of arrival in the cooling water loop in which the de-mineralizer line 18 is cut off according to the exemplary embodiment of the present invention under the same condition (or worsened condition).

TABLE 1

| External air at 30° C. | PMP (rpm) | Current limiting time of arrival (s) |
|---|---|---|
| Related art (de-mineralizer line is not cut off) | 3,500 | 89.4 |
| The invention (de-mineralizer line is cut off) | 3,500 | 97.8 |

TABLE 2

| External air at 33° C. | PMP (rpm) | Current limiting time of arrival (s) |
|---|---|---|
| Related art (de-mineralizer line is not cut off) | 3,500 | 76.9 |
| The invention (de-mineralizer line is cut off) | 3,200 | 87.1 |

Referring to Table 1, in the case of external air at 30° C., it may be confirmed that the high temperature current limiting time of arrival is increased by 8.4 seconds at the time of cutting off the de-mineralizer line in the same pump operation rate (3500 rpm) and it may be confirmed that the current limiting time of arrival is increased by 10.2 seconds even though the pump operation rate is reduced to 3200 rpm in the evaluation of the external air at 33° C.

Therefore, in the case of using the thermal management system for a fuel cell vehicle according to the exemplary embodiment of the present invention, the vehicle current limiting time of arrival may be increased and thus the heat radiating performance may be sufficiently secured even in the situation of the high output operation in the hot season.

Further, the flow rate of cooling water passing through the de-mineralizer line may be cut off in the high output state, and therefore the contact time of the ion resin with the high temperature cooling water may be shortened, thereby improving durability of the de-mineralizer.

Further, as shown in the above Table 1, since the heat radiating performance may be sufficiently secured even though the pump operation rate is reduced, the effect of improving fuel efficiency of the vehicle depending on the reduction in the pump operation rate is also predicted.

Meanwhile, a thermal management method using the thermal management system for a fuel cell vehicle having the above configuration performs the following steps. First, the output state of the vehicle is detected and it is determined to which of the preset low output section, normal output section, and high output section the detected output state belongs. The controller determines the open value of the 3-way valve 15 depending on the determined section. Here, the determination of the open value of the 3-way valve 15 is as described above.

That is, in the low output section, the controller controls the 3-way valve to close the first port 15a which is connected to the radiator line 20 side and completely open the second port 15b which is connected to the bypass line 14.

Further, in the high output section, the controller controls the 3-way valve to completely open the first port 15a and close the second port 15b.

On the other hand, in the normal output section, the controller controls the 3-way valve to partially open both of the first port 15a and the second port 15b. Meanwhile, in the normal output section, the controller controls the 3-way valve to partially open both of the first port and the second port.

In this case, in the determining of the open value of the 3-way valve 15, the flow rate passing through the de-mineralizer line 18 is determined depending on the open value of the 3-way valve 15.

That is, the flow rate passing through the de-mineralizer line 18 is increased and reduced depending on the open value of the second port 15b in proportion to the bypass flow rate passing through the second port 15b in the normal output section, and the maximum flow rate is formed in the low output section, while the second port 15b is closed in the high output section, such that the flow rate passing through the de-mineralizer line 18 is not generated.

Meanwhile, the control method in each section determined depending on the temperature of cooling water performs a control similar to the control in each section as described above.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A thermal management system for a fuel cell vehicle, comprising:
    a radiator configured to dissipate heat generated from a fuel cell stack through cooling water;
    a de-mineralizer disposed in a branch line branched from a cooling water circulating line connecting between the fuel cell stack and the radiator allowing the cooling water to pass therethrough; and
    a 3-way valve configured to selectively introduce the cooling water passing through the radiator or the cooling water passing through a bypass line formed in front of an inlet of the radiator within the cooling water circulating line from the fuel cell stack and includes a first port, a second port, and a third port,
    wherein the first port is connected to a radiator line along which the cooling water passing through the radiator flows, the second port is connected to the bypass line along which the cooling water passing from the fuel cell stack and the de-mineralizer flows, and the third port is configured to be connected to a fuel cell stack side of the cooling water circulating line, and
    the de-mineralizer line along which the cooling water passing through the de-mineralizer flows is branched from a line between a pump and the fuel cell stack and connected to the bypass line in front of the second port such that a flow rate of the de-mineralizer line is cut off when the second port is closed.

2. The thermal management system of claim 1, wherein the 3-way valve is configured to open both of the first port and the second port or selectively open only one of the first port and the second port.

3. The thermal management system of claim 2, further comprising:
    a controller configured to control an open value of the 3-way valve.

4. The thermal management system of claim 3, wherein the controller divides a section into a low output section, a normal output section, and a high output section depending on an output state of the vehicle and variably controls the open value of the 3-way valve in each section.

5. The thermal management system of claim 4, wherein the controller performs a control to close the first port connected to the radiator line side and completely open the second port connected to the bypass line in the low output section, completely open the first port and close the second port in the high output section, and partially open both of the first port and the second port in the normal output section.

6. The thermal management system of claim 5, wherein the controller is configured to increase and reduce the flow rate passing through the de-mineralizer line depending on the open value of the second port in proportion to the bypass flow rate passing through the second port in the normal output section and to prevent a flow rate from passing through the de-mineralizer line by closing the second port during the high output section.

7. The thermal management system of claim 3, wherein the controller divides a section into a low temperature section, a reference temperature section, and a high temperature section depending on the temperature of cooling water of the vehicle and variably controls the open value of the 3-way valve in each section.

8. The thermal management system of claim 7, wherein the controller closes the first port connected to the radiator line side and completely opens the second port connected to the bypass line in the low temperature section, completely opens the first port and close the second port in the high temperature section, and partially opens both of the first port and the second port in the reference temperature section.

9. The thermal management system of claim 8, wherein the controller is configured to increase and reduce the flow rate passing through the de-mineralizer line depending on the open value of the second port in proportion to the bypass flow rate passing through the second port in the reference temperature section and prevents generation of a flow rate passing through the de-mineralizer line by closing the second port during operation in the high temperature section.

10. The thermal management system of claim 8, wherein the low temperature section occurs when the temperature of cooling water of the vehicle is less than a preset reference temperature X, the high temperature section occurs when the temperature of cooling water of the vehicle exceeds the reference temperature X, and the reference temperature section is set to be a section in which the temperature of cooling water is the reference temperature X.

11. The thermal management system of claim 1, further comprising:

a water pump that circulates cooling water and is disposed between the 3-way valve and the fuel cell stack.

12. The thermal management system of claim 11, further comprising:
a heater that increases the temperature of cooling water which is disposed between the water pump and the fuel cell stack.

* * * * *